(No Model.)
H. BERRY.
MIRROR.
No. 464,004.
Patented Dec. 1, 1891.
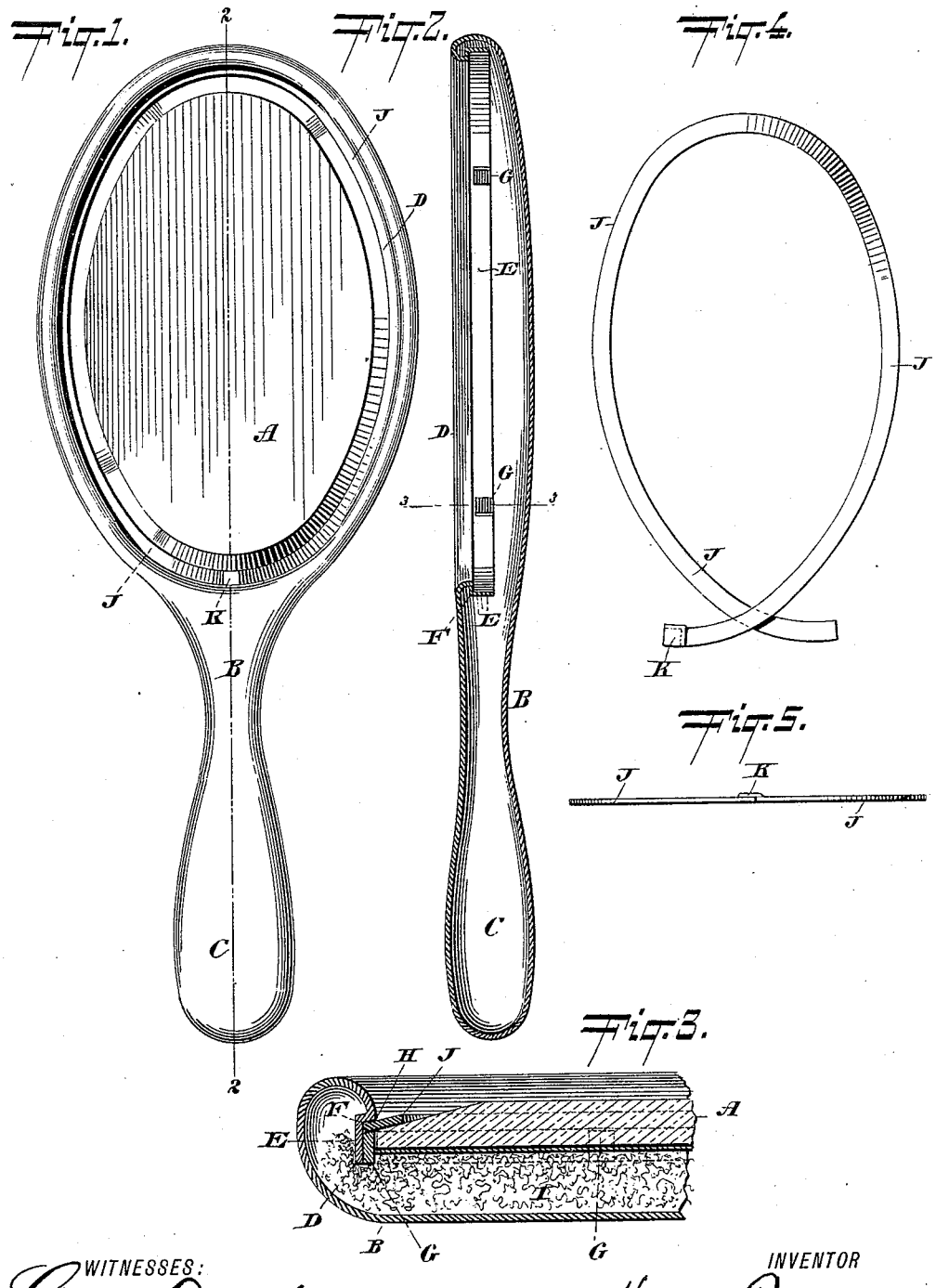

UNITED STATES PATENT OFFICE.

HENRY BERRY, OF SHELTON, CONNECTICUT, ASSIGNOR TO THE DERBY SILVER COMPANY, OF SAME PLACE.

MIRROR.

SPECIFICATION forming part of Letters Patent No. 464,004, dated December 1, 1891.

Application filed July 11, 1891. Serial No. 399,236. (No model.)

*To all whom it may concern:*

Be it known that I, HENRY BERRY, a citizen of the United States, and a resident of Shelton, in the county of Fairfield and State of Connecticut, have invented certain new and useful Improvements in Mirrors, of which the following is a specification.

The invention relates to improvements in mirrors, and more particularly in that class of toilet-mirrors in which the glass is secured within an inclosing rim formed on a back of metal or other suitable material.

The invention consists, essentially, in novel means hereinafter described by which the mirror may be securely held in its metal back without marring the appearance of the article and with great convenience.

Referring to the accompanying drawings, Figure 1 is a plan view of the face of a toilet-mirror incorporating the elements of the invention; Fig. 2, a central vertical longitudinal section of same on the dotted line 2 2 of Fig. 1, the mirror being omitted from the back. Fig. 3 is an enlarged transverse section of same, with the mirror in position, on the dotted line 3 3 of Fig. 2. Fig. 4 is a detached plan view of a split ring, with its ends crossed preparatory for insertion in the mirror-receiving cavity to lock the mirror in position; and Fig. 5 is a detached edge view of the split ring and illustrating its joint-covering plate.

In the drawings, A indicates the mirror, and B the back, of metal or other suitable material. The back B is provided with the usual handle C and with the receiving-cavity D for the mirror A. The cavity D is entirely encompassed by the flange E, which extends downward within the back B and is provided with the continuous horizontal shoulder F and series of vertical shoulders or bearing-points G. The horizontal shoulder F extends outward a suitable distance beyond the edge H of the back, as shown, while the vertical shoulders G extend inward a distance equal to the width of the shoulder F, thus bringing their vertical faces in line with the mouth of the cavity D.

I do not confine the invention to the use of any special number of vertical shoulders G, since they simply constitute bearing-points for the mirror A; but in the present instance I employ four of these shoulders, two being at each side of the mirror, and this number will be found sufficient.

In the putting together of the parts of the mirror the usual compressible cushion I will be inserted in the cavity D and the mirror A then placed thereon and firmly depressed until it passes below the horizontal shoulder F and is inclosed by the vertical shoulders G, projecting inward from the flange E, whereupon, and before relieving the pressure from the mirror, the split metallic ring J will be inserted around the edge of the mirror, its inner edge overlapping the edges of said mirror and its outer edges passing beneath the shoulder F and above the shoulders G, where it finds a suitable bearing and is securely held by the upward tension of the cushion I. As soon as the split ring J is inserted in position beneath the shoulder F, the pressure on the face of the mirror will be withdrawn, whereupon the upward force exerted by the cushion I, acting through the mirror, will firmly bind the ring J against the shoulder F, and the mirror, ring, and cushion will thereby be firmly held in place.

The split ring J forms an essential feature of the present invention, and said ring is made from a flat strip of metal and provided on one of its ends with the small plate K, which is rigid with said end and adapted to project over and cover the other end of said ring when the latter is in position beneath the shoulder F. The plate K conceals the joint formed at the meeting ends of the ring J and affords a finish consistent with the general character of the article without marring the metal back A. Since the split ring J is greater in exterior outline than the entrance to the cavity D, it will be found expedient on applying said ring to cross its ends, as illustrated in Fig. 4, and then, after applying the ring, to permit or cause said ends to move outward to their normal position, so that the extremities of said ends will face each other and the joint formed by them be covered by the plate K. If it should become necessary, the ring J may be withdrawn at any time and then reinserted without destroying it or causing injury to the back A.

What I claim as my invention, and desire to secure by Letters Patent, is—

1. The back having the cavity D, the encompassing flange E, the shoulder F, and a bearing for the edges of the mirror, combined with the mirror A and split ring J, one end of the latter having the joint-covering plate K, substantially as set forth.

2. The back having the cavity D, encompassing flange E, horizontal shoulder F, and vertical shoulders G, combined with the cushion I, mirror A, and split ring J, one end of the latter having the joint-covering plate K, substantially as set forth.

Signed at Shelton, in the county of Fairfield and State of Connecticut, this 8th day of July, A. D. 1891.

HENRY BERRY.

Witnesses:
B. H. WETHERBY,
C. F. WILBUR.